(12) United States Patent
Ovshinsky et al.

(10) Patent No.: US 6,605,375 B2
(45) Date of Patent: Aug. 12, 2003

(54) METHOD OF ACTIVATING HYDROGEN STORAGE ALLOY ELECTRODE

(75) Inventors: Stanford R. Ovshinsky, Bloomfield Hills, MI (US); Boyko Aladjov, Rochester Hills, MI (US); Srinivasan Venkatesan, Southfield, MI (US); Subhash K. Dhar, Bloomfield Hills, MI (US); Thomas Hopper, Clarkston, MI (US); Kevin Fok, Troy, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 20 days.

(21) Appl. No.: 09/796,280

(22) Filed: Feb. 28, 2001

(65) Prior Publication Data

US 2002/0119351 A1 Aug. 29, 2002

(51) Int. Cl.[7] .............................................. H01M 10/44
(52) U.S. Cl. ..................... 429/13; 429/218.2; 429/21; 429/23; 429/50; 429/52; 205/57; 420/900
(58) Field of Search ................ 429/13, 218.2, 429/21, 23, 50, 52; 205/57; 420/900

(56) References Cited

U.S. PATENT DOCUMENTS 5,560,752 A * 10/1996 Badding et al. ........... 29/623.1

6,447,942 B1 * 9/2002 Ovshinsky et al. ........... 429/27

OTHER PUBLICATIONS

Wu et al., Pulse activation of hydrogen–storage alloy electrodes in nickel/metal hydride batteries, 2000, J Electrochem Soc, 147(11), 4065–4070.*

Mao–Sung Wu, Yung–Yun Wang, and Chi–Chao Wan Pulse Activation of Hydrogen–Storage Alloy Electrodes in Nickel/Metal Hydride Batteries Journal of The Electrochemical Society, Nov., 2000 pp. 4065–4070, vol. 147, issue 11, Publisher: The Electrochemical Society, Inc. Country: United States of America.

* cited by examiner

*Primary Examiner*—Patrick Ryan
*Assistant Examiner*—Angela J. Martin
(74) *Attorney, Agent, or Firm*—Philip H. Schlazer; Marvin S. Siskind

(57) ABSTRACT

A method of activating a hydrogen storage alloy electrode. The method comprises the step of applying current cycles to the electrode where each current cycle includes a forward pulse effective to at least partially charge the electrode and a reverse pulse effective to at least partially discharge the electrode.

5 Claims, 1 Drawing Sheet

METHOD OF ACTIVATING HYDROGEN STORAGE ALLOY ELECTRODE

FIELD OF THE INVENTION

The present invention is related to hydrogen storage alloy electrodes. In particular, the present invention is related to a method of activating hydrogen storage alloy electrodes.

BACKGROUND OF THE INVENTION

Hydrogen storage alloy materials are used in a variety of applications. Examples of such applications include both rechargeable electrochemical cells as well as fuel cells. Rechargeable electrochemical cells using a hydrogen storage alloy as the active material for the negative electrode are known in the art. The negative electrode is capable of the reversible electrochemical storage of hydrogen. The positive electrode typically comprises a nickel hydroxide active material although other active materials, such as manganese hydroxide, may be used. The negative and positive electrodes are spaced apart in an alkaline electrolyte. A suitable separator (i.e., a membrane) may also be positioned between the electrodes. As used herein the terminology "metal hydride material", "hydrogen storage alloy", and "hydrogen absorbing alloy" are synonymous.

Upon application of an electrical current to the negative electrode, the active metal hydride material is charged by the absorption of hydrogen. This is shown by reaction (1).

$$M+H_2O+e^- \rightarrow M\text{-}H+OH^- \text{ (Charging)} \quad (1)$$

Upon discharge, the stored hydrogen is released by the metal hydride material to provide an electric current. This is shown by reaction (2).

$$M\text{-}H+OH^- \rightarrow M+H_2O+e^- \text{ (Discharging)} \quad (2)$$

The reactions at a conventional nickel hydroxide positive electrode as utilized in a nickel-metal hydride electrochemical cell are as follows:

$$Ni(OH)_2+OH^- \rightarrow NiOOH+H_2O+e^- \text{ (Charging)} \quad (3)$$

$$NiOOH+H_2O+e^- \rightarrow Ni(OH)_2+OH^- \text{ (Discharging)} \quad (4)$$

Based on the pioneering principles of Stanford R. Ovshinsky, a family of extremely efficient electrochemical hydrogen storage materials were formulated. These are the Ti—V—Zr—Ni type active materials such as those disclosed in U.S. Pat. No. 4,551,400 ("the '400 Patent") the disclosure of which is incorporated herein by reference. These materials reversibly form hydrides in order to store hydrogen. All the materials used in the '400 Patent utilize a generic Ti—V—Ni composition, where at least Ti, V, and Ni are present with at least one or more of Cr, Zr, and Al.

Other examples of metal hydride alloys are provided in U.S. Pat. No. 4,728,586 ("the '586 Patent") the disclosure of which is incorporated herein by reference. The '586 Patent describes a specific sub-class of these Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Still other examples of hydrogen absorbing alloys are provided in U.S. Pat. No. 5,536,591 ("the '591 Patent"), the disclosure of which is incorporated herein by reference. In particular, the '591 Patent provides teaching on the type of surface interface at the metal hydride electrode and the nature of catalytic sites ideal for promoting high rate discharge.

In part, due to the research into the negative electrode active materials, the Ovonic nickel-metal hydride batteries have demonstrated excellent performance characteristics such as power, capacity, charging efficiency, rate capability and cycle life. Presently, there is an increasing use of rechargeable nickel-metal hydride batteries in all types of portable tools, appliances, and computer devices. As well, there is a growing use of nickel-metal hydride cells in applications such as electric and hybrid-electric vehicles. Many of the new uses for the nickel-metal hydride cells require that further improvements be made in the cell's performance.

One of the crucial steps in the preparation of a hydrogen storage alloy electrode is that of "activation". Activation increases the rate at which the hydrogen storage alloy reacts with hydrogen or the extent to which hydrogen is incorporated into the alloy to form the metal hydride.

Activation is believed to result from 1) removal of reducible surface oxide which tends to interfere with the functioning of the material, 2) reduction of particle size resulting from an increase in volume, which fractures the alloy particles, and 3) changes in the chemical composition and/or structure of the alloy or the surface of the alloy. Activation, it is believed, increases the surface area and alters the chemical composition of the alloy surface.

Activation may be achieved through the surface treatment of the electrode by subjecting the electrode to an alkaline or acidic etching treatment. This type of surface treatment alters the surface oxides of the hydrogen storage alloy. An example of a hot alkaline etch treatment is provided in U.S. Pat. No. 4,716,088, the disclosure of which is incorporated by reference herein. Another form of activation is a pulse-potential process as described in U.S. Pat. No. 5,560,752, the disclosure of which is also incorporated by reference herein. This activation process applies an alternating hydriding/dehydriding potential to the electrode. The present invention is directed to an alternate activation process which uses current pulses to activate the hydrogen storage alloy electrode.

SUMMARY OF THE INVENTION

Disclosed herein is a method of activating a hydrogen storage alloy electrode, comprising the step of:

applying a plurality of current cycles to the electrode, each of the current cycles including a first pulse effective to at least partially charge the electrode and a second pulse effective to at least partially discharge the electrode.

Also disclosed herein is a method of activating a fuel cell electrode including a hydrogen storage alloy, the method comprising the step of:

applying a plurality of current cycles to the fuel cell electrode, each of the current cycles including a first pulse effective to at least partially charge the electrode and a second pulse effective to at least partially discharge the electrode

DETAILED DESCRIPTION OF THE INVENTION

Figure 1:
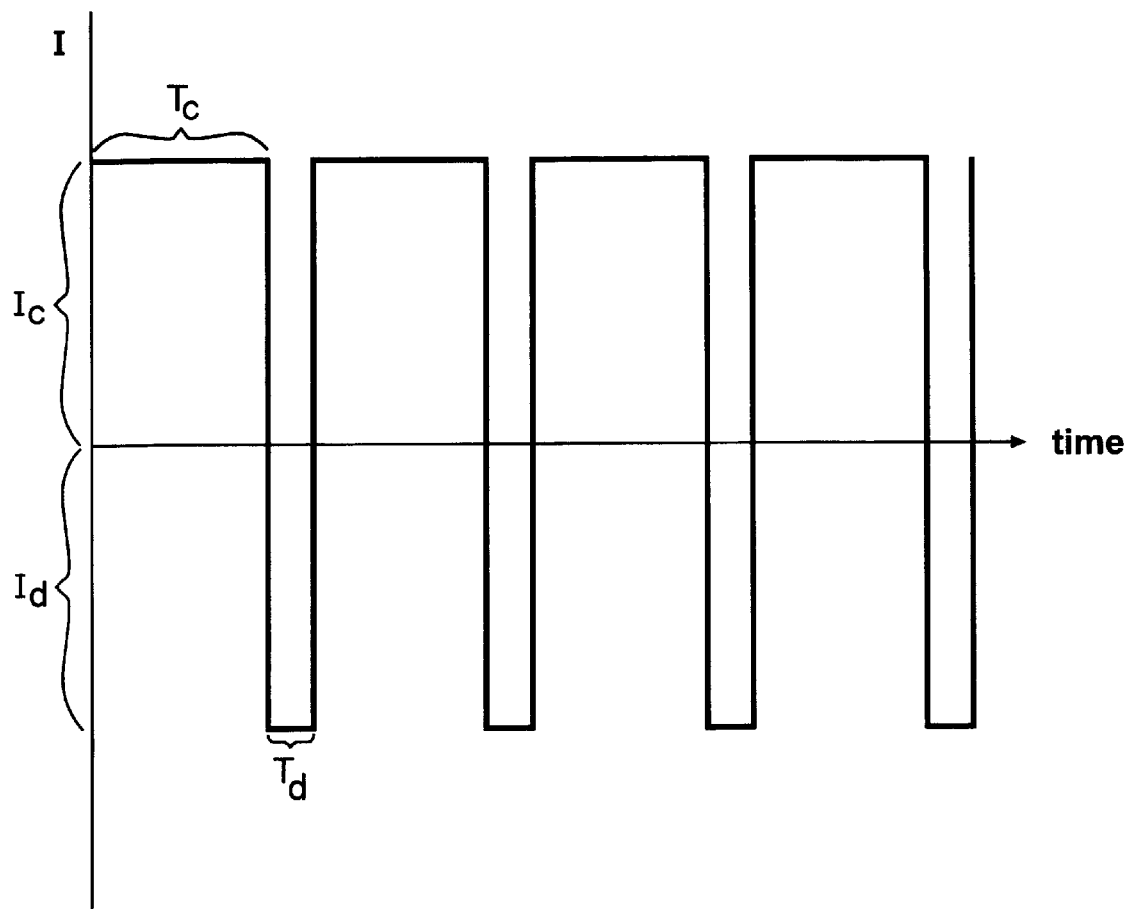
FIG. 1 is a drawing the current cycle waveform.

The present invention is directed to a method of activating a hydrogen storage alloy electrode. The activation of the electrode is achieved by "current pulsing" the electrode. That is, the electrode is subjected to a plurality of current cycles. Each current cycle includes a "forward" current pulse effective to at least partially charge the electrode. Each current cycle further includes a "reverse" current pulse effective to at least partially discharge the electrode. Preferably, each forward current pulse is sufficient to only partially charge the electrode and each reverse current pulse is sufficient to only partially discharge the electrode. A sufficient number of current pulse cycles are applied to the electrode until the desired amount of activation is achieved. Preferably, pulses are applied until the electrode reaches a charge level which is at least 100% of its theoretical capacity. More preferably, the pulses are applied until the electrode is charged to at least 125% of its theoretical capacity.

A schematic diagram of an embodiment of the current cycle waveform in shown in FIG. 1. Referring to FIG. 1, it is seen that each current cycle includes a forward or charging current pulse applied at a substantially constant current $I_c$ for a time $T_c$. The charging current pulse is followed by a reverse or discharging current pulse applied at a substantially constant current $I_d$ for a time period $T_d$. Of course, other waveform embodiments are possible where the currents $I_c$ and $I_d$ can be made to vary with time (rather than being constant with time). The currents as well as the time periods that the currents are applied may be varied.

The amount of charging per cycle (that is, the amount of charging due to a forward or charging current pulse) is equal to the charging current $I_c$ multiplied by the charging time period $T_c$. The amount of discharging per cycle (that is, the amount of discharging due to the reverse or discharging current pulse) is equal to the discharge current $I_d$ multiplied by the discharge time period $T_d$. Preferably, the amount of charging per cycle due to a forward current pulse is greater than the amount of discharging per cycle due to a reverse current pulse so that $I_c T_c > I_d T_d$.

The ratio of the amount of charging per cycle to the amount of discharging per cycle is referred to herein as the charge-discharge ratio. It is preferable that the charge-discharge ratio is at least 5 to 1, more preferably at least 6 to 1, and most preferably at least 7.5 to 1. It is also possible that the charge-discharge ratio may be at least 10 to 1. The charge-discharge ratio may be changed by altering the pulse width of the charging pulse and/or the discharging pulse. It may also be changed by altering the current level of the charging pulse and/or the discharging pulse. In one embodiment, the current levels $I_c$ and $I_d$ of the charging and discharging pulses are kept the same (that is $I_d = I_c$) while the pulse widths $T_c$ and $T_d$ are adjusted to reach the appropriate charge-discharge ratio. Hence, in this case, the ratio of $T_c$ to $T_d$ is preferably at least 5 to 1, more preferably at least 6 to 1, most preferably at least 7.5 to 1. In certain cases it may also be as high as at least 10 to 1.

The amount in which the electrode is charged by each of the forward charging pulses (that is, the amount of charging per cycle) is a certain percentage of its total charge capacity of the electrode. Preferably, the amount of charging per cycle cause by a forward current pulse is less than the total capacity of the electrode. Preferably, the amount of charging per cycle is less than about 10 percent of the total charge capacity of the electrode. More preferably, the amount of charging per cycle is less than about 10 percent of the total charge capacity but greater than about one-tenth of one percent of the total charge capacity of the electrode. Most preferably, the amount of charging per cycle is less than one-tenth of one percent of the total charge capacity of the electrode. Decreasing the amount of charging per cycle allows for an increase in the total number of charge-discharge cycles that can be applied to the electrode.

Prior to be current pulsed, the electrode may be charged to an initial charge level. For example, the electrode may preferably be charge to a charge level which is between about 10% state of charge and about 60% state of charge. More preferably, the electrode may be charged to a charge level which is between about 10% state of charge and about 50% state of charge.

While not wishing to be bound by theory, it is believed that repeatedly charging and discharging the electrode forces the absorption and desorption of hydrogen atoms by the hydrogen storage alloy. This causes expansion and contraction of the alloy which induces stress and forms cracks within the alloy material. The cracking increases the surface area and porosity of the alloy material. Increased surface area improves the overall utilization and capacity of the material.

Furthermore, it is also believed that the reverse or discharge current pulses encourages dissolution of the surface oxide. Specifically, the reverse or discharge current pulses temporarily change the potential of the negative hydrogen storage alloy electrode to anodic values where metal/oxide dissolution is favored. The current cycling technique also effectively takes care of subtle variations in the oxide thickness from batch to batch by subjecting each bath to common anodic discharge pulses. The discharge current pulses also may impose certain density changes in the hydrogen storage alloy electrode, thereby producing micropores through which electrolyte is distributed throughout the electrode. This causes the activation of the electrode to be more complete and uniform. It is noted that the present current pulsing scheme allows for accurate control of the currents applied to the hydrogen storage alloy electrode.

The current pulsing technique of the present invention may be used to activate the hydrogen storage alloy electrode prior to being sealed in an actual electrochemical cell. However, the same technique may be used to activate the electrode after the electrode is sealed in the electrochemical cell. In either case, the electrolyte may either be kept at room temperature or at an elevated temperature during the current cycling technique. The temperature of the electrolyte is preferably at least 80° C., more preferably at least 100° C. and most preferably at least 120° C.

Moreover, the current cycling technique is applicable to electrodes which have previously been heat-treated by a chemical activation process such as by an alkaline or acidic etch process. As discussed above, a chemical activation process is described in U.S. Pat. No. 4,716,088.

It is also noted that the present activation method may be used to activate hydrogen storage alloy electrodes useful for the negative electrode of an electrochemical cell. It may also be used as the $H_2$ electrode, or anode, of a fuel cell. Discussion of alkaline fuel cell is provided is U.S. patent application Ser. No. 09/524,116, incorporated by reference herein.

EXAMPLE 1

A hydrogen storage alloy material is mixed with a binder and pasted onto a conductive substrate to form a hydrogen storage alloy electrode. The electrode is used as the negative electrode of a test electrochemical cell. A conventional nickel hydroxide electrode is used as the positive electrode. The electrodes are placed in an alkaline electrolyte. The potential of the negative electrode is measured relative to a standard hydrogen electrode. Current cycles are applied to the hydrogen storage alloy negative electrode. The electrode is first charged to a level of about 50% state of charge at a charging rate of C/40. Following this, the hydrogen storage alloy electrode is repeatedly charged for 72 seconds ($T_c$=72 seconds) at a C/10 rate ($I_c$=C/10) and then discharged for 3 seconds ($T_d$=3 seconds) at a C/2.5 rate ($I_d$=C/2.5). In this case amount of charging per cycle is about 0.2% of total charging capacity while the charge to discharge ratio per cycle is about 6 to 1. The electrode is current pulsed until it is charged to about 125% of its theoretical capacity.

EXAMPLE 2

A hydrogen storage alloy material is mixed with a binder and pasted onto a conductive substrate to form a hydrogen storage alloy electrode. The hydrogen storage alloy electrode is used as the $H_2$ electrode (also commonly referred to as the anode) of a fuel cell. The potential of the hydrogen storage alloy electrode is measured relative to a mercury/mercury oxide reference electrode. A carbon-based electrode is used as the oxygen electrode of the test fuel cell. A third auxiliary electrode (for example, a nickel electrode) is used as the counter electrode for charging and discharging the hydrogen storage alloy electrode. The hydrogen storage alloy electrode is first charged to a 50% state of charge at a charging rate of C/40. Following this, the hydrogen storage alloy electrode is repeatedly charged for 60 seconds ($T_c$=60 seconds) at a C/20 rate ($I_c$=C/20) and then discharged for 10 seconds ($T_d$=10 seconds) at a C/40 rate ($I_d$=C/40). In this case, the amount of charging per cycle is about 0.084% of total charge capacity while the charge to discharge ratio per cycle is about 6 to 1. The electrode is current pulsed until it is charged to about 125% of its theoretical capacity.

EXAMPLE 3

A hydrogen storage alloy material is mixed with a binder and pasted onto a conductive substrate to form a hydrogen storage alloy electrode. The hydrogen storage alloy electrode is used as the $H_2$ electrode (also commonly referred to as the anode) of a fuel cell. The potential of the hydrogen storage alloy electrode is measured relative to a mercury/mercury oxide reference electrode. A carbon-based electrode is used as the oxygen electrode of the test fuel cell. A third auxiliary electrode (for example, a nickel electrode) is used as the counter electrode for charging and discharging the hydrogen storage alloy electrode. The hydrogen storage alloy electrode is first charged to a 50% state of charge at a charge rate of C/40. Following this, the electrode is repeatedly charged for 60 seconds ($T_c$=60 seconds) at a C/40 rate ($I_c$=C/40) and then discharged for 5 seconds ($T_d$=10 seconds) at a C/20 rate ($I_d$=C/20). In this case, the amount of charging per cycle is about 0.042% of total charge capacity while the charge to discharge ratio per cycle is about 6 to 1. The electrode is current pulsed until it is charged to about 125% of its theoretic capacity.

We claim:

1. A method of activating a hydrogen storage alloy electrode, comprising the step of:

applying a plurality of controlled current cycles to said electrode, each of said current cycles including a forward current pulse effective to at least partially charge said electrode and a reverse current pulse effective to at least partially discharge said electrode.

2. The method of claim 1, wherein the amount of charging per cycle cause by said forward current pulse is greater than the amount of discharging per cycle caused by said reverse current pulse.

3. The method of claim 1, wherein the ratio of the amount of charging per cycle to the amount of discharging per cycle is at least 5 to 1.

4. The method of claim 1, wherein the amount of charging per cycle caused by said forward current pulse is less than ten percent of total charge capacity.

5. The method of claim 1, wherein the amount of charging per cycle cause by said forward current pulse is less than one-tenth of one percent of the total charge capacity.

* * * * *